United States Patent [19]

Wang et al.

[11] Patent Number: 4,869,826

[45] Date of Patent: Sep. 26, 1989

[54] CELLULAR ADSORBENTS FOR REMOVAL OF VIRAL CONTAMINANTS FROM BLOOD AND COMPLEX PROTEIN SOLUTIONS

[75] Inventors: Henry Y. Wang; I-Fu Tsao, both of Ann Arbor, Mich.

[73] Assignee: Process Biotechnology, Inc., Ann Arbor, Mich.

[21] Appl. No.: 91,728

[22] Filed: Sep. 1, 1987

[51] Int. Cl.$^4$ .............................................. B01D 15/08

[52] U.S. Cl. ................................ 210/679; 210/198.2; 210/502.1; 210/635; 210/905; 422/1; 422/28; 435/176; 435/180; 502/401; 530/380; 530/415; 530/826

[58] Field of Search ................... 435/5, 235, 239, 176, 435/177, 180, 181; 530/415, 350, 380, 826; 424/89, 101; 422/1, 28; 604/4, 5; 502/400, 401, 403, 407; 210/635, 679, 198.2, 500.1, 500.21–500.43, 501, 502.1, 905, 908, 601, 656

[56] References Cited

U.S. PATENT DOCUMENTS

| | | | |
|---|---|---|---|
| 2,506,345 | 5/1950 | Cox et al. | 424/89 |
| 3,826,613 | 7/1974 | Goldkaldas et al. | 435/5 |
| 3,919,044 | 11/1975 | Melnick et al. | 435/239 |
| 3,957,580 | 5/1976 | Nelson | 435/181 |
| 4,168,300 | 9/1979 | Andersson et al. | 210/679 |
| 4,176,174 | 11/1979 | Russell et al. | 436/823 |
| 4,178,360 | 12/1979 | Cleeland et al. | 436/540 |
| 4,195,074 | 3/1980 | Safford, Jr. | 530/806 X |
| 4,282,315 | 8/1981 | Luderer et al. | 435/5 |
| 4,361,484 | 11/1982 | Larsson et al. | 210/500.38 |
| 4,411,795 | 10/1983 | Olsen | 210/679 |
| 4,481,189 | 11/1984 | Prince | 424/101 |
| 4,553,553 | 11/1985 | Homann et al. | 128/749 |

OTHER PUBLICATIONS

Tsao et al., "The Removal of Adventitious Viruses and . . . " Bio/Technology, 11/1988, pp. 1330–1333.

Einarsson, M. et al., "Adsorption of Hepatitis B Surface Antigen to Matrix-Bound Long Chain Hydrocarbon Structures", Experientia, vol. 32/4, Apr. 1976, pp. 456–457.

Marciniak, M. et al., "Quantitative Removal of Hepatitis B Viral Antigens from Serum by a Monoclonal IgM Coupled to a Biocompatible Solid-Phase Support", PNAS USA, vol. 80, Jun. 1983, pp. 3821–3925.

Charm, S. et al., "An Immunoadsorbent Process for Removing Hepatitis Antigen from Blood and Plasma", Biotech. and Bioeng., vol. XVI, pp. 593–607 (1974).

Kaltzmann et al., Letters to Nature, vol. 312, 20–27, Dec., 1984, p. 767.

Dalgleish, A. et al., "The CD4 (T40 Antigen is an Essential Component for the Receptor for the AIDS Retrovirus", Letters to Nature, vol. 312, 20–27, Dec., 1984, p. 765.

Chemical Abstract-Japan-"Immobilized Hepatitis-B Virus Antibody in Filters for the Removal of the Virus from Blood", CA95(26):225655d (1981).

Einarsson, M. et al., "Removal of Hepatitis B Virus from a Concentrate of Coagulation Factors II, VII, IX and X by Hydrophobic Interaction Chromatography", J. Virol, Meth., vol. 3, (1984), pp. 213–228.

Einarsson, M. et al., "Adsorption Properties of Different Hepatitis B Virus Related Antigens (HBsAg, HBcAg, HBeAg) on Octanohydrazine-Sepharose 4B", J. Virol, Meth., vol. 5, (1984), pp. 233–241.

Gellis, S. et al., "Chemical, Clinical, and Immunological Studies on the Products of Human Plasma Fractionation XXXVI Inactivation of the Virus of a Homologous Serum Hepatitis in Solutions of Normal Human Serum Albumin by Means of Heat", J. Clin. Invest., vol. 27, pp. 239–244, (1948).

Frosner, G. et al., "Inactivation of Hepatitis A Virus Added to Pooled Human Plasma by Beta-Propiolactone Treatment and Ultraviolet Irradiation", Euro, J. Clin. Microbio., vol. 2, No. 4, pp. 355–357, (1983).

Ng, P. et al., "Pasteurization of Antiheophilic Factor and Model Virus Inactivation Studies", Thrombosis Res., vol. 39, pp. 439–447, (1985).

Dalen, A., "The Effect of Glutaraldehyde on the Stability of Erythrocytes and on Virus Receptor Substances", Acta Path. Microbial, Scand., Sect. B., vol. 84, pp. 196–200, (1976).

Primary Examiner—W. Gary Jones
Attorney, Agent, or Firm—Harness, Dickey & Pierce

[57] ABSTRACT

Cellular adsorbents for removing viral contaminants from whole blood and protein solutions are prepared by immobilizing and stabilizing cells or portions thereof cellular receptors for the target contaminants. Removal of the viral contaminants from solution is effected by affinity binding of viral proteins of the contaminant and their corresponding immobilized cellular receptors.

25 Claims, 1 Drawing Sheet

CELLULAR ADSORBENTS FOR REMOVAL OF VIRAL CONTAMINANTS FROM BLOOD AND COMPLEX PROTEIN SOLUTIONS

BACKGROUND OF THE INVENTION

The present invention relates generally to the removal of viruses from solution and, more particularly, to the preparation of immobilized cellular adsorbents used for removal of viral contaminants from blood, plasma, serum, and blood-derived products.

Viruses in blood products used for intravenous administration present well-recognized risks of infection despite health history evaluations and serological screening. Infections which have been transmitted in this manner include hepatitis and AIDS. Similarly, the presence of viruses in animal sera supplied for cell culture often results in contamination of the culture.

Numerous attempts have been made to prevent or eliminate viral contamination in solution by inactivating the viruses. However, the problems encountered in viral inactivation in blood and protein solutions are distinct from the problems of viral inactivation in other aqueous solutions. Viruses in many aqueous solutions can easily be inactivated by pasteurization, radiation and/or chemical sterilization. In contrast, whole blood, some blood protein fractions and most protein solutions such as protein-based pharmaceuticals are sensitive to such physical or chemical treatments.

Pasteurization or thermal inactivation, a widely accepted method of sterilizing certain proteins such as albumin, commonly results in a marked reduction or elimination of functional activity of labile proteins such as clotting factors. Use of high concentrations of polysaccharides to stabilize proteins during pasteurization unfortunately also increases the thermoresistance of the viruses. Viral inactivation by treatment of serum or plasma with beta-propiolactone and UV irradiation and by lipid solvent treatments results in a significant loss of functional activity of proteins.

Loss of proteins functional activity is similarly encountered when blood-based solutions are treated by hydrophobic interaction chromatography to remove the viruses from solution. Antibody-based chromatography using polyclonal antibodies and monoclonal IgM as affinity ligands preserves protein activity, but has the disadvantage of being too specific. The presence of mutants and different types of antigenic determinants thus often leads to failure of binding the target viruses. Removal of viruses from solution by filtration is also not practical because of the trade-off between required pore size restriction and the low filtrate flux.

Thus, there is a need for an improved method for removal of viral contaminants especially from blood and complex protein solutions. The present invention provides such an improved method and an adsorbent for carrying out the method. Further understanding of the invention will be had from the following disclosure taken in conjunction with the drawing and claims.

SUMMARY OF THE INVENTION

The present invention provides a novel approach for removal of viral contaminants such as viruses and virus-infected cells in which immobilized cellular adsorbents prepared in accordance with the method of the present invention are used as affinity ligands to bind and remove viral contaminants from solution. In accordance with the present invention, immobilized cellular adsorbents for a target viral contaminant are prepared by a method comprising the steps of:

(A) selecting a cell bearing a cellular receptor for said target viral contaminant;

(B) immobilizing at least a portion of said cell, said portion bearing said cellular receptor thereon, onto a biologically-compatible support surface; and (C) modifying said cell portion to stabilize said portion.

The present invention thus provides a means for sterilization of blood or other protein solutions by removal of viral contaminants by cellular adsorbents prepared by the method of the invention. Sterilization by cellular adsorbents of the present invention offers several advantages over conventional methods of sterilization. Since viral protein-cellular receptor interactions are specific bindings with high affinity, product loss due to non-specific adsorption is reduced to a minimum. Also, cellular receptors possess a much broader adsorption spectrum than immunoadsorbents, thus widening the range of viruses removed to include variants of the targeted contaminants.

A further advantage of the present invention is that use of cellular adsorbents of the present invention does not result in a significant decrease of protein function or therapeutic effectiveness of the solution being processed. Also, lysis of whole cells such as blood cells can be kept to a minimum. Thus, whole blood can be easily and effectively sterilized by the adsorbents of this invention. Additionally, cellular adsorbents of the present invention can be used not only to remove whole viruses, but other viral contaminants such as infected cells carrying viral-encoded proteins on their surface. Further, cellular adsorbents of the present invention are also relatively inexpensive and easy to prepare.

DETAILED DESCRIPTION OF THE INVENTION

Figure 1:
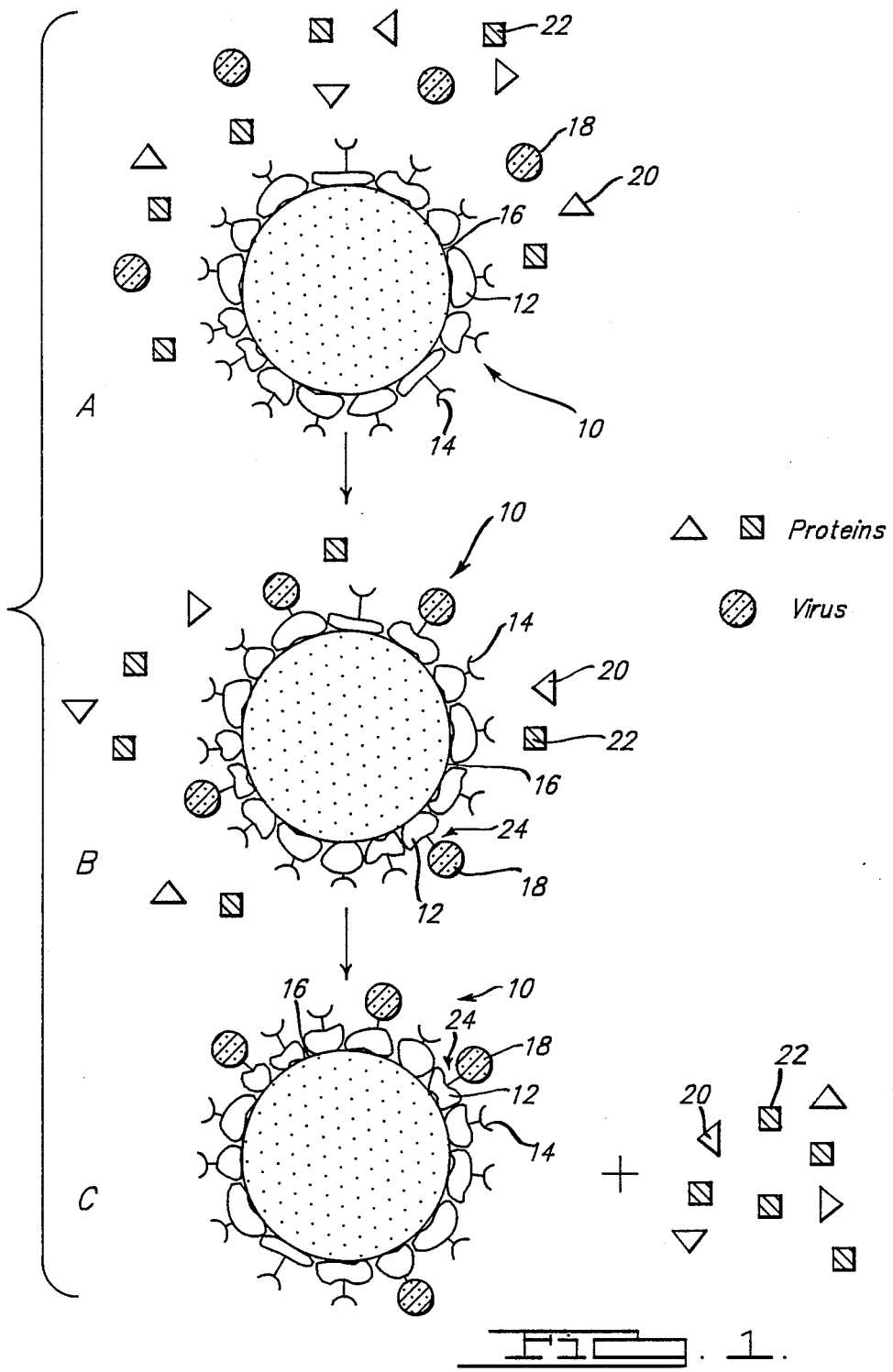
FIG. 1 is a schematic diagram illustrating a preferred embodiment of the method of virus adsorption using an immobilized cellular adsorbent of the present invention.

In accordance with the present invention, cellular adsorbents for removing viral contaminants from solution are prepared by immobilizing and stabilizing cells or cell parts bearing cellular receptors on a biologically-compatible support surface. The term viral contaminants, as used herein, includes whole viruses, viral fragments, infected cells expressing viral proteins or any other contaminants which contain or mimic viral proteins to which cellular receptors exhibit binding affinity.

Referring now to FIG. 1, a cellular adsorbent of the present invention is illustrated and indicated generally by the numeral 10. Cellular adsorbent 10 generally comprises a cell or cell part 12 bearing at least one cellular receptor 14 thereon which has been immobilized on a support surface 16 and thereafter stabilized to prevent disruption of that adsorbent. Cellular receptor 14 or cell part 12 to be immobilized is selected for specificity for a target virus 18.

In use, cellular adsorbent 10 is brought into contact with a solution contaminated with target virus 18. As depicted in FIG. 1A, the solution may be a complex protein solution containing a plurality of proteins 20, 22 in addition to target virus 18. As shown in FIG. 1B, after contact with cellular adsorbent 10, target virus 18 in solution will bind to a cellular receptor 14 of the adsorbent, as shown at 24, while other proteins 20, 22 stay in solution. The protein solution, now substantially free of target virus 18 which is bound to cellular adsorbent 10, can then be separated from adsorbent, as illustrated in FIG. 1C, and collected for further use.

Cells to be immobilized in accordance with the present invention are selected for their membrane receptor specificity for the viral contaminants to be removed from solution. Proteins of cells, such as cell ghosts or purified plasma membrane, may also be used in conjunction with or in lieu of whole cells. Additionally, more than one type of cell or portion thereof with overlapping or different viral specificities may be selected to further extend the adsorption spectrum. Table 1 sets forth examples of "receptor maps" of certain cells.

TABLE 1

EXAMPLES OF RECEPTOR MAPS OF VIRUSES

| Cell | Virus |
|---|---|
| T4-lymphocyte | HTLV-I, HTLV-II, HTLV-III (HIV) |
| Hepatocyte | Hepatitis B v. |
|  | Non-A, non-B hepatitis v. |
| Human foreskin fibroblasts | Human cytomegalovirus |
| Rat T-lymphocyte | Influenza |
|  | B(H2N2), A(H2N2), A(H3N2) |
|  | Newcastle disease v. |
|  | Sendai v. |
| HeLa | Human Rhinovirus |
|  | types 2, 1a, 1B |
|  | Human Rhinovirus |
|  | types 14, 3, 5, 15, 39, 41, 51 |
|  | Polioviruses |
|  | Coxsackieviruses |
|  | Adenoviruses |
| Erythrocyte | New Castle Dis. v. |
|  | Influenza A |
|  | Sendai v. |
|  | Rubella v. |
|  | Reovirus |
| Mouse A-9 | MVM |
| FLC |  |
| GMK AH-1 | HSV-1 |
| Vero | HSV-2 |
| SIRC |  |
| HeLa S3 |  |
| HEP-2 |  |
| HEL |  |
| Murine teratoma | Coxsakie B3 |
| F9, F12, PCC4 | Mouse hepatitis |
| Mouse embryo | Sindbis |
| fibroblast | Semliki Forest |
| Daudi cells | Lymphocytic choriomeningitis |
|  | Pichinde |
|  | Vesicular stomatitis |
|  | HSV-1 |
|  | Cytomegalovirus |
| BHK-21 | FMDV |
|  | types $A_{12}$, $O_{1B}$, $C_{3Res}$ |
| Murine & Human | Reovirus type 1 |
| Ependymal cell | Mumps v. |
|  | Parainfluenza type 3 |
|  | HSV-1 |
| SEM | Mengovirus |
| FLC | EMCV |
| L-929 |  |
| HeLa |  |
| L8CL3-U | Coxsackie v. |
|  | types A2, A5, B3 |
|  | HSV-1 |
| HeLa | Rhinovirus |
| L cell | 24 serotypes |
| BHK-21 | ERA Rabi v. |
| Neuroblastoma | RV 194-2 |
| C1300 | VSV |
|  | Reovirus type 3 |
|  | West Nile v. |

With the advent of genetic engineering, selected cells can also be quantitatively programmed to over-express certain receptor proteins on their surface to maximize their adsorption capacity for a specific virus. Alternatively, a cell line with an expanded adsorption spectrum of multispecificity for several viruses may be constructed by incorporating genes encoding the corresponding cellular receptors.

The cells or cell parts to be immobilized in accordance with the method of the invention can be either anchorage-dependent or anchorage-independent. It should be appreciated that the nature and adhesive properties of the cell surface can be affected by its composition, charge, and age. The composition, charge, and shape of the support material also influences the attachment of cells to the surface.

Materials used for the cell support surface can be beads, membranes or other conventional supports which are biologically-compatible with the biological systems involved. By biologically-compatible support surface is meant a support surface which does not substantially adversely affect, or release any undesired components or products which substantially adversely affect, the cellular adsorbents, the immobilization or stabilization processes, or the solution being processed. Suitable materials for support surfaces include polymeric materials, for example polysaccharides such as alginate, agarose, carrageenan, dextran, and cellulose, as well as gelatin, glass, acrylic copolymers, titanium oxide, ceramic and other compounds or materials on which cell immobilization can be achieved. Materials of a non-porous nature are preferred in order to eliminate non-specific adsorptions of desired proteins onto an intraporous surface.

A variety of surface immobilization methods can be employed to attach the selected cells or cell parts to the support surface. For example, cells can be covalently attached by coupling them to a support surface previously activated by a cross-linking agent. In ionic attachment, the support surface is treated to provide a polyanionic or polycationic surface to which cells can attach through charge interactions.

Alternatively, cells or cell parts can be immobilized by affinity binding which involves specific interactions between molecules on the cell surface and corresponding proteins immobilized on the support surface. Typical affinity interactions include antigen-antibody, hormone-receptor, and lecti-glycoprotein binding. Cell attachment can also be achieved by cultivating anchorage-dependent cells on a suitable support surface, such as microcarrier beads.

In addition to immobilizing the cells or cell parts on the support surface, the plasma membranes of the immobilized cells or parts thereof must be stabilized. Animal cells, in contrast to bacterial cells, lack cell walls which provide a rigid mechanical support against shear stress and osmolarity changes in the environment. As a result, their plasma membranes are particularly sensitive to disruption and disintegration.

Disruption of the immobilized plasma membrane of the adsorbent can destabilize the surface for viral protein binding and also contaminate the solution being processed by the release of cell membrane components into the solution. If whole cells are being used, membrane disruption can also lead to cell leakage of intracellular components into the solution and further contamination of the solution. Stabilization of the plasma membrane is thus necessary to prevent such contamination. Additionally, intercellular, as well as intracellular, stabilization of membrane proteins will further enhance stability of the membrane surface and will provide a more contiguous binding surface for viral contaminants.

Plasma membranes can be stabilized by treatment with a cross-linking agent to cross-link the membrane proteins. Suitable cross-linking agents include glutaraldehyde and other aldehydes, benzoquinone, carbonyldiimidazole, periodate and the like. The toxicity of the cross-linking agent employed should be as low as possible, and should preferably have a minimal effect on glycoproteins since most known cellular receptors for viruses are glycoproteins. The stabilization of the plasma membranes by the cross-linking agent should also not significantly hamper the functional activities of the cellular receptors. This can be achieved by selecting a suitable cross-linking agent at an appropriate concentration which is generally very low, for example, 0.1% by volume for glutaraldehyde.

Alternatively, the risk of contamination may be minimized by preparing adsorbents from receptor-bearing cell parts or cells whose intracellular components have been released beforehand in a controlled manner. For example, immobilized eukaryotic cells can be hypotonically lysed to release their cell contents without unduly affecting their membrane composition. Subsequent stabilization of the immobilized membranes will then provide a more stable and contiguous surface for viral binding.

In use, the immobilized and stabilized adsorbent is contacted with whole blood or any other solution to be processed for a sufficient time to permit the adsorbent to bind the target viral contaminant and remove substantially all contaminants from solution. By substantially all is meant the reduction of virus or viral contaminant to a level below detection by conventional methods such as hemagglutination and plaque assays. Optionally, after processing of the solution has been completed and the solution collected, the cellular adsorbent is disposed of to eliminate any risk of release of undesired materials or contaminants into a second solution during re-use of the adsorbent.

It will be appreciated that, although cellular adsorbents of the present invention will remove target viral contaminants from a contaminated solution, the adsorbents of the invention can also be used to routinely treat blood or other solutions not specifically known to be contaminated. Such routine processing would be highly desirable for whole blood and blood products prior to intravenous administration to reduce the risk of infection of the recipient.

In Example 1, discussed in detail below, virus removal by a cellular adsorbent prepared in accordance with the method of the present invention is exemplified by the adsorption of influenza A virus by immobilized chicken erythrocyte membranes. Chicken erythrocytes with cellular receptors for influenza A virus were first immobilized on polycationic beads in a column. Ghosts of the immobilized erythrocytes were then prepared by subjecting them to hypotonic conditions and the membranes were then resealed. The immobilized erythrocyte membranes were stabilized by treatment with low concentrations of glutaraldehyde. Influenza A virus in buffered solution was twice passed through the column of immobilized erythrocyte membranes to effect removal of substantially all of the influenza A viral population from solution.

In Example 2, a cellular adsorbent for cytomegalovirus removal was prepared by cultivating anchorage-dependent human foreskin fibroblasts on microcarriers and then stabilizing the cell membranes with low concentrations of glutaraldehyde. In Example 3, a cellular receptor adsorbent for removal of herpes simplex virus was identically prepared by cultivating anchorage-dependent BSC-1 cells on microcarriers and stabilizing them with low concentrations of glutaraldehyde. Similar cellular adsorbents can be prepared for removal of hepatitis viruses using anchorage-dependent hepatocytes.

In Example 4, cellular adsorbent for removal of human T-cell lymphotropic viruses (HTLV) was prepared by affinity binding T-cells to carboxylate modified latex microspheres bearing a lectin specific for human T cells. The T-cell membranes were then stabilized by low concentrations of glutaraldehyde.

It will be appreciated that the method of the present invention is versatile and subject to variation and that the specific cellular adsorbent and its preparation will be dependent upon the type of cells, immobilization supports and target contaminants involved. All percentages given herein are by volume unless otherwise indicated.

EXAMPLE 1

Chicken erythrocytes were washed twice with phosphate buffer saline (PBS) to remove extracellular proteins and resuspended in sucrose-acetate buffer (SAB). The PBS contained 150 mM NaCl and 5 mM sucrose, pH 5.2. Polyacrylamide beads coated with polyethyleneimine were used as a polycationic solid support (Affi-Gel 731). The beads were hydrated and then washed three times with 0.2 M NaCl solution, twice with distilled water and twice with SAB. 0.5 ml of 50% bead suspension was added dropwise to a same volume of 50% erythrocyte suspension with occasional gentle shaking. All percentages given herein and in Examples 2–4 are by volume unless otherwise indicated. After the erythrocytes were bound to the surface, dextran sulfate (1 mg/ml, M.W. 5,000) in SAB was added to neutralize the surface sites not covered by the cells. The immobilized erythrocyte beads were then washed three times with SAB, gently enough to avoid cell disruption and detachment.

Hypotonic treatment to obtain ghost cells were performed in hemolysis medium (4 mM $MgSo_4$, 3.8 mM $CH_3COOH$, pH 3.8) for 5 minutes. 10 ml of PBS was added to resume the tonicity. The supernatant containing intracellular debris and vesicles was aspirated after the beads settled down. To reseal the erythrocyte ghosts, 10 ml of PBS was added and followed by incubation of the suspension at 37° C. for 15 minutes. The beads were then washed three times with PBS. The immobilized membranes were then stabilized by incubating the beads with 0.1% glutaraldehyde at room temperature for one hour with gentle shaking. Finally, the immobilized and stabilized membranes were washed three times with PBS to remove excess cross-linking agent and other materials and stored at 4° C.

Table 2 demonstrates the titer reduction of influenza A virus in minimal essential medium (MEM) with Earle's salts supplemented with 10% fetal bovine serum (FBS) after being passed through the column packed with immobilized erythrocyte beads. The passes through the column were performed at 4° C. because viral neuraminidase, which could destroy the receptors for hemagglutinin and facilitate the elution of virions from cell surface, is not active in the low temperature range. As shown in Table 2, the hemagglutination (HA) tests showed that viruses were removed below detectable levels after the second pass. The HA tests of the subsequent passes were negative and indicated that the viruses were not being released from the beads.

TABLE 2

THE AFFINITY OF INFLUENZA A VIRUSES BY SURFACE-IMMOBILIZED ERYTHROCYTE GHOSTS

| HA unit  | 1 | 2 | 3 | 4 | 8 | 16 | 32 | 64 | 128 |
|----------|---|---|---|---|---|----|----|----|-----|
| control  | + | + | + | + | + | +  | +  | +  | −   |
| 1st pass | + | − | − | − | − | −  | −  | −  | −   |
| 2nd pass | − | − | − | − | − | −  | −  | −  | −   |
| 3rd pass | − | − | − | − | − | −  | −  | −  | −   |
| 4th pass | − | − | − | − | − | −  | −  | −  | −   |
| 5th pass | − | − | − | − | − | −  | −  | −  | −   |

*Hemagglutination tests were performed with two-fold serial dilution. The positive sign means the viruses are present and preventing the settlement of erythrocytes, while the negative sign indicates the virus titer is below the detectable limit of the HA test.

EXAMPLE 2

Anchorage-dependent human foreskin fibroblasts were grown on microcarriers (Superbead, Flow laboratories) in minimal essential medium (MEM) with Earle's salts supplemented with 10% fetal bovine serum (FBS) and 1.1 g/l sodium bicarbonate and incubated at 37° C. in a humidified 4% $CO_2$ - 96% air atmosphere. After cell growth reached confluency, the microcarriers were washed twice using HEPES-buffered saline (HBS), then incubated with 0.05% glutaraldehyde at room temperature for one hour with occasional shaking. The residual glutaraldehyde was removed by washing the microcarrier four times using HBS. The final preparation which can be used to adsorb cytomegalovirus was resuspended in HBS and stored at 4° C.

EXAMPLE 3

Anchorage-dependent BSC-1 cells were grown on microcarriers (Superbead, Flow laboratories) in minimal essential medium (MEM) with Earle's salts supplemented with 10% fetal bovine serum (FBS) and 1.1 g/l sodium bicarbonate and incubated at 37° C. in a humidified 4% $CO_2$ - 96% air atmosphere. After cell growth reached confluency, the microcarriers were washed twice using HEPES-buffered saline (HBS), then incubated with 0.05% glutaraldehyde at room temperature for one hour with occasional shaking. The residual glutaraldehyde was removed by washing the microcarrier four times using HBS. The final preparation which can be used to adsorb herpes simplex viruses was resuspended in HBS and stored at 4° C.

EXAMPLE 4

A layer of buffy coat was separated from human venous blood by equilibrium centrifugation using a Ficoll-Paque medium. Buffy coat cells, namely B cells, T cells and monocytes, were incubated with carboxylate modified latex microspheres with average diameter of 2u at room temperature for one hour. The microspheres bear the lectin helix pomatia which specifically binds human T cells. A final centrifugation concentrated and separated out a fairly pure fraction of immobilized T cells. The clusters of T cells and microspheres were incubated with 0.05% glutaraldehyde solution at room temperature for one hour with gentle shaking. The final preparation which can be used to adsorb HTLV viruses was resuspended in HBS and stored at 4° C.

What is claimed is:

1. A method of removing substantially all of a target virus population from a solution comprising the steps of:
   (A) selecting a cell bearing a cellular receptor for said target virus population;
   (B) immobilizing at least a portion of said cell, said portion bearing said cellular receptor thereon, onto a biologically-compatible support surface;
   (C) modifying said cell portion to substantially stabilize said portion; and
   (D) contacting said solution with said immobilized stabilized cell portion for a time sufficient to permit binding of said viruses of said population to said cellular receptor, wherein steps (B) and (C) are carried out in sequence.

2. The method of claim 1, wherein step (C) is carried out by treating said cell portion with a cross-linking agent.

3. The method of claim 2, wherein said cells are erythrocytes and said target virus population comprises influenza viruses.

4. The method of claim 2, wherein said cells are BSC-1 and said target virus population comprises herpes simplex viruses.

5. The method of claim 2, wherein said cells are human fibroblasts and said target virus population comprises cytomegalovirus.

6. The method of claim 2, wherein said cells are T-lymphocytes and said target virus population comprises T-cell lymphotropic viruses.

7. The method of claim 2, wherein said cells are hepatocytes and said target virus population comprises hepatitis viruses.

8. The method of claim 1, wherein said solution comprises a protein solution.

9. The method of claim 1, wherein said solution comprises whole blood.

10. The method of claim 1, wherein said time sufficient to permit binding is further sufficient to reduce the titer of said target virus to a level below detection.

11. A method of preparing a cellular adsorbent for removing a target viral contaminant from a solution comprising the steps of:
   (A) selecting a cell bearing a cellular receptor for said target viral contaminant;
   (B) immobilizing at least a portion of said cell, said portion bearing said cellular receptor thereon, onto a biologically-compatible support surface; and
   (C) modifying said cell portion to substantially stabilize said portion, wherein steps (B) and (C) are carried out in sequence.

12. The method of claim 11, wherein step (C) is carried out by treating said cell portion with a cross-linking agent.

13. The method of claim 12, wherein said cross-linking agent comprises glutaraldehyde.

14. The method of claim 12, wherein said cell portion is a portion of a membrane of said cell and said membrane is prepared by hypotonic lysis of said cell.

15. The method of claim 12, wherein said target viral contaminant is selected from a group of viruses consisting of hepatitis viruses, herpes viruses, retroviruses and T-cell lymphotropic viruses.

16. The adsorbent prepared by the method of claim 12.

17. The method of claim 11, wherein step (B) is carried out by covalently binding said portion of said cell onto said biologically-compatible support surface.

18. The method of claim 11, wherein step (B) is carried out by ionic binding of said portion of said cell onto said biologically-compatible support surface.

19. The method of claim 11, wherein step (B) is carried out by affinity binding of said portion of said cell onto said biologically-compatible support surface.

20. The method of claim 11, wherein said cells are anchorage-dependent cells.

21. The method of claim 11, wherein said cellular receptor is overexpressed.

22. The adsorbent prepared by the method of claim 11.

23. A method for removing a viral contaminant from a blood-based protein solution comprising the steps of:
 (A) selecting a cell having a membrane bearing cellular receptors for said target viral contaminant;
 (B) immobilizing at least a portion of said membrane on a biologically-compatible support surface;
 (C) substantially stabilizing said portion of said membrane by treating said portion with a cross-linking agent;
 (D) contacting said stabilized immobilized portion of said membrane with said blood-based protein solution for a time sufficient to permit binding of said viral contaminant to said cellular receptors; and
 (E) collecting said blood-based solution after said binding of said viral contaminant, wherein steps (B) and (C) are carried out in sequence.

24. A method for treating a protein solution comprising the steps of:
 (A) selecting a cell having a membrane bearing a receptor for a target virus, viral fragment or viral protein or combination thereof;
 (B) immobilizing at least a portion of said membrane on a biologically-compatible support surface;
 (C) modifying said portion of said membrane to substantially stabilize said portion;
 (D) contacting said immobilized stabilized portion of said membrane with said solution; and
 (E) collecting said solution after said contact, wherein steps (B) and (C) are carried out in sequence.

25. The method of claim 24, wherein said protein solution comprises blood.

* * * * *

UNITED STATES PATENT AND TRADEMARK OFFICE
CERTIFICATE OF CORRECTION

PATENT NO. : 4,869,826

DATED : September 26, 1989

INVENTOR(S) : Henry Y. Wang and I-Fu Tsao

It is certified that error appears in the above-identified patent and that said Letters Patent is hereby corrected as shown below:

Title page:

Other Publications: "(T40" should be --(T4)--.

Abstract: line 3, insert "bearing" after --thereof--.

Column 1, line 41, "proteins" should be --protein--.

Column 4, line 6, "of" should be --or--.

Column 6, line 47, "were" should be --was--.

Column 7, line 62, "helix pomatia" should be --helix pomatia--.

Signed and Sealed this

Thirtieth Day of April, 1991

Attest:

HARRY F. MANBECK, JR.

*Attesting Officer*  *Commissioner of Patents and Trademarks*